(12) United States Patent
Miller

(10) Patent No.: US 11,292,311 B2
(45) Date of Patent: Apr. 5, 2022

(54) SPACE FRAME FRONT UPPER SUSPENSION CONNECTION

(71) Applicant: Caterpillar Inc., Peoria, IL (US)

(72) Inventor: Tad W. Miller, Bonney Lake, WA (US)

(73) Assignee: Caterpillar Inc., Peoria, IL (US)

( * ) Notice: Subject to any disclaimer, the term of this patent is extended or adjusted under 35 U.S.C. 154(b) by 348 days.

(21) Appl. No.: 16/664,124

(22) Filed: Oct. 25, 2019

(65) Prior Publication Data

US 2021/0122210 A1    Apr. 29, 2021

(51) Int. Cl.
*B60G 99/00*    (2010.01)
*B62D 21/15*    (2006.01)
*B62D 21/11*    (2006.01)

(52) U.S. Cl.
CPC .............. *B60G 99/002* (2013.01); *B62D 21/11* (2013.01); *B62D 21/152* (2013.01); *B60G 2204/4304* (2013.01)

(58) Field of Classification Search
CPC .......... B60G 99/002; B60G 2204/4304; B62D 21/11; B62D 21/152
IPC ................................. B60G 99/002,2204/4304
See application file for complete search history.

(56) References Cited

U.S. PATENT DOCUMENTS

| | | | |
|---|---|---|---|
| 4,071,277 A * | 1/1978 | Stedman | B60P 1/16 180/60 |
| 7,883,100 B1 | 2/2011 | Wu | |
| 9,623,912 B2 | 4/2017 | Schlangen | |
| 9,650,078 B2 | 5/2017 | Kinsman et al. | |
| 9,701,341 B2 | 7/2017 | Ormiston et al. | |
| 9,731,773 B2 | 8/2017 | Gami et al. | |
| 9,783,041 B2 | 10/2017 | Uranaka et al. | |
| 10,155,543 B2 | 12/2018 | Uranaka et al. | |
| 2007/0176387 A1 | 8/2007 | Tsuruta et al. | |
| 2014/0319813 A1 | 10/2014 | Inoue et al. | |
| 2015/0210319 A1* | 7/2015 | Tiramani | B62D 23/005 280/756 |
| 2017/0015185 A1* | 1/2017 | Uranaka | B62D 21/186 |

FOREIGN PATENT DOCUMENTS

| | | |
|---|---|---|
| GB | 686685 | 1/1953 |
| JP | 2001113923 | 4/2001 |
| KR | 10-2004-0101795 | 12/2004 |
| WO | 2015129012 | 9/2015 |

* cited by examiner

*Primary Examiner* — Lori L Lyjak
(74) *Attorney, Agent, or Firm* — Oblon, McClelland, Maier & Neustadt

(57) ABSTRACT

A front upper suspension connection for a space frame comprises a bottom surface fixedly attachable to a front lower suspension connection; a top rear mounting surface fixedly attachable to a front upper frame connection; a top front mounting surface fixedly attachable to a first elongate support member; a front strut attachment point located below the top rear mounting surface and the top front mounting surface to pivotably attach a front strut; and a lower rear mounting surface located below the top rear mounting surface fixedly attachable to a second elongate support member. The front strut attachment point can include a hole passing through the top rear mounting surface, a coaxial hole passing through the top front mounting surface, and a front strut attachment pin configured to pass through the top rear mounting surface, the top front mounting surface, and a top mounting hole integral to the front strut.

20 Claims, 7 Drawing Sheets

SPACE FRAME FRONT UPPER SUSPENSION CONNECTION

TECHNICAL FIELD

The present disclosure relates to space frames, and more particularly to space frame front upper suspension connections, and systems, components, and methods thereof.

BACKGROUND

Conventional haul trucks, such as off-highway rear haul trucks, may use welded steel frames that can be extremely heavy and may require many meters of welding to fabricate a completed frame. Space frames offer a lighter and stronger alternative to traditional welded steel frames, since far less steel is required. As a result, space frames offer considerable benefits in terms of cost, manufacturability, and performance. For example, haul trucks with space frames comparatively can haul larger payloads and consume less fuel.

Conventional space frame structures may use fabricated nodal connections. Such nodal connections may be used to create space frame structures associated with static applications. However, vehicular applications are, at least in part, dynamic in nature, and haul trucks can represent a particularly difficult application because of loads applied to the space frame as well as bending, twisting, and/or flexing that can occur as the haul truck travels on various types of terrain, such as off highway terrain. Carefully designed high-strength castings and fabrications can be required to provide appropriate stiffness and flexibility characteristics while insuring proper load transfer from the dump body to the wheels.

U.S. Pat. No. 10,183,706 ("the '706 patent") describes a node for interconnecting frame members of a frame. According to the '706 patent, a plurality of cup-shaped node connectors are disposed on the node body, where each of the node connectors includes a closed end attached to the node body and an open end opposite the closed end and extending away from the node body. The '706 patent also describes that a sidewall extends between and connects the closed end to the open end and a tenon is formed on the open end. According to the '706 patent, the tenon is shaped and sized to fit within a frame member, and a transition is formed between the sidewall and the tenon defining a peripheral, radially outward facing groove in cooperation with the frame member, where the groove is shaped and sized to receive a weld.

SUMMARY OF THE DISCLOSURE

In one aspect, a front upper suspension connection fabrication for a space frame of a haul truck is disclosed. The front upper suspension connection fabrication can comprise a bottom surface configured to weldably attach to a front lower suspension connection fabrication; a top rear mounting surface configured to weldably attach to a front upper frame connection fabrication; a top front mounting surface configured to weldably attach to a horizontal front frame tube; a front strut attachment point located below the top rear mounting surface and the top front mounting surface configured to pivotably attach a front strut of a front suspension system; and a lower rear mounting surface located below the top rear mounting surface configured to weldably attach an angled front frame tube that connects the front upper suspension connection fabrication to a front lower frame connection casting. The front strut attachment point can include a hole passing through the top rear mounting surface, a coaxial hole passing through the top front mounting surface, and a front strut attachment pin configured to pass through the top rear mounting surface, the top front mounting surface, and a top mounting hole integral to the front strut.

In another aspect, a space frame of a rear haul truck is disclosed. The space frame can be comprised of a first front upper suspension connection fabrication; and a second front upper suspension connection fabrication spaced from the first front upper suspension connection fabrication in a width direction of the space frame. Each of the first and second front upper suspension connection fabrications can include a bottom interface adapted to weldably attach to a front lower suspension connection fabrication, a rear plate having a top rear mounting surface adapted to weldably attach to a front upper frame connection fabrication, and a lower rear mounting surface below the top rear mounting surface adapted to weldably attach an angled front frame tube, a front plate having a top front mounting surface adapted to weldably attach to a horizontal front frame tube, and a front strut attachment interface located below the top rear mounting surface and the top front mounting surface adapted to pivotably attach a front strut of a front suspension system, wherein the front strut attachment interface has a first hole in the rear plate and a second hole in the front plate, the first and second holes being coaxial. The front strut attachment interfaces of the first and second front upper suspension connection fabrications face outward in opposite directions in the width direction of the space frame.

And in yet another aspect, a method regarding a front upper suspension connection is disclosed. The method can comprise providing a top segment of the front upper suspension connection; and providing a bottom segment of the front upper suspension connection, the bottom segment being below and in direct contact with the top segment. The top segment can include a top rear mounting surface of a first wall adapted to fixedly attach to a front upper frame connection, a lower rear mounting surface of the first wall below the top rear mounting surface adapted to fixedly attach a first elongate support member, a top front mounting surface of a second wall spaced from the first wall adapted to fixedly attach to a second elongate support member, and a front strut attachment interface below the top rear mounting surface and the top front mounting surface adapted to pivotably attach a front strut of a front suspension system, wherein the front strut attachment interface has a first hole in the first wall and a second hole in the second, the first and second holes being coaxial. The bottom segment can include a bottom interface adapted to fixedly attach to a front lower suspension connection.

Other features and aspects of this disclosure will be apparent from the following description and the accompanying drawings.

DETAILED DESCRIPTION

Figure 1:
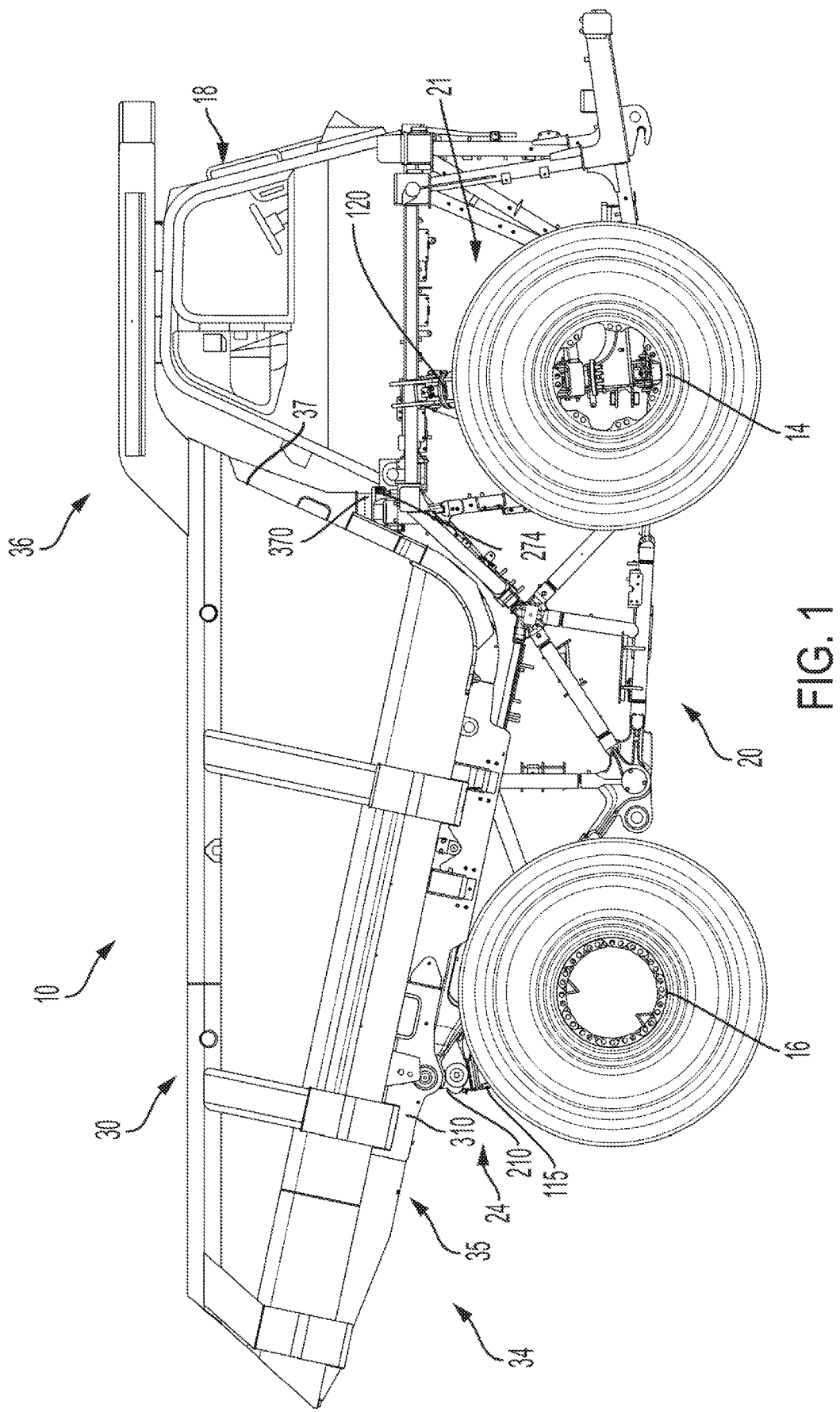
FIG. 1 is a side view of a machine according to embodiments of the disclosed subject matter.
Figure 2:
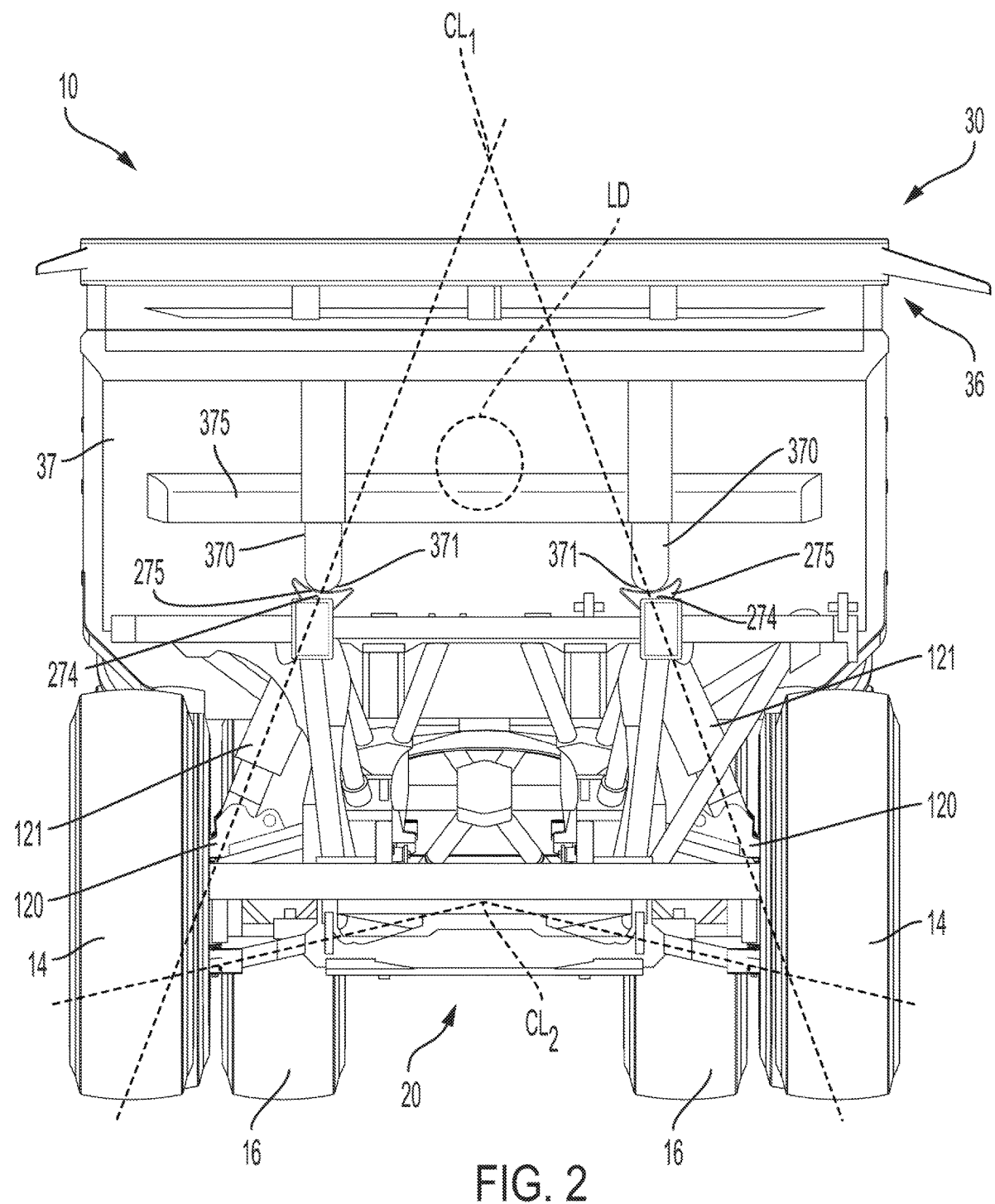
FIG. 2 is a front view of the machine of FIG. 1 with an operator cabin thereof removed to show a space frame and a dump body thereof according to embodiments of the disclosed subject matter.

Referring now to the drawings and with specific reference to FIG. 1 and FIG. 2, these figures illustrate an exemplary embodiment of a machine 10. Machine 10 may be a mobile machine that performs some type of operation associated with an industry such as mining, construction, or any other industry known in the art. For example, as shown in FIG. 1 and FIG. 2, machine 10 may be an earth moving machine, particularly, an off-highway rear haul truck 10.

Machine 10 may have a space frame 20 supported by front wheels 14 and rear wheels 16 (including respective tires). The front and rear wheels 14, 16 may be connected to space frame 20 by front suspension members and rear suspension systems, respectively. Machine 10 may also include a bed or body 30 supported by the space frame 20. Such bed or body 30 may be referred to herein as a dump body 30. The dump body 30 can be configured as a receptacle to receive hauling material.

A rear portion 34 of the dump body 30 can be pivotably coupled or attached to a portion (including portions) at a rear 24 of the space frame 20. Discussed in more detail below, portions of the dump body 30 between the rear portion 34 and a front portion 36 of the dump body 30 can be movably positioned relative to respective portions of the space frame 20 to support the dump body 30 on the space frame 20 at a rest position of the dump body 30. The rest position of the dump body 30 may be considered as positioning of the dump body 30 such that the front portion 36 of the dump body 30 is at a lower-most position (i.e., not raised). The dump body 30 can be pivoted at the rear portion 34 about the rear 24 of the space frame 20 to raise or lower the portion of the dump body 30 in front of the pivot (and hence move the portion of the dump body 30 behind the pivot in the opposite direction). Such pivoting of the dump body 30 to raise the front portion 36 of the dump body 30 can be to dump content from within the dump body 30. Likewise, pivoting of the dump body 30 to lower the front portion 36 of the dump body 30 to the rest position can be to receive content in the dump body 30.

Machine 10 may have an operator cabin 18 supported by the space frame 20 at a front of the space frame 20. Machine 10 may also be equipped with a steering mechanism and controls to move the machine 10 and controls to raise and lower dump body 30. The steering mechanism and the controls may be located within the operator cabin 18 of the machine 10.

Machine 10 may have a prime mover (not expressly shown) supported by the space frame 20. Generally, the prime mover may be provided in a space 21 of the space frame 20 at a front of the space frame 20. The prime mover may be configured to propel the front and rear wheels 14, 16 in the forward or rearward direction. The prime mover may be lengthwise aligned on space frame 20 along a travel direction of the machine 10. One skilled in the art will recognize, however, that the prime mover may be aligned transversally. In one exemplary embodiment, the prime mover may be an internal combustion engine, which may be a two-stroke or four-stroke diesel engine, for instance. One skilled in the art will recognize, however, that the prime mover may be any other type of internal combustion engine, such as a gasoline engine or a gaseous fuel-powered engine. The prime mover may be connected to front and/or rear wheels 14, 16 via other components such as a drive train (not shown) to transfer motive power to move the front and/or rear wheels 14, 16 in a forward or rearward direction.

Exhaust from the prime mover may be output from one or more exhaust outputs (not expressly shown). Optionally, the one or more exhaust outputs may be provided generally between the operator cabin 18 and a front wall 37 of the dump body 30 such that exhaust is provided toward at least a predetermined portion of the front wall 37. A coupling (e.g., bellows) may be provided to connect the one or more exhaust outputs to the front wall 37 of the dump body 30, for instance, to a heating channel provided in or on the front wall 37 of the dump body 30 to heat the material carried in the dump body 30.

In general, a space frame according to embodiments of the disclosed subject matter, such as space frame 20, may be a frame that includes structural members connected to each other at nodes and/or joints. The structural members can include hollow tubes and/or solid tubes, and in some instances can be connected according to a triangulated structural. The structural members can be made of metal, metal alloys, or reinforced composite materials, for instance.

Figure 3:
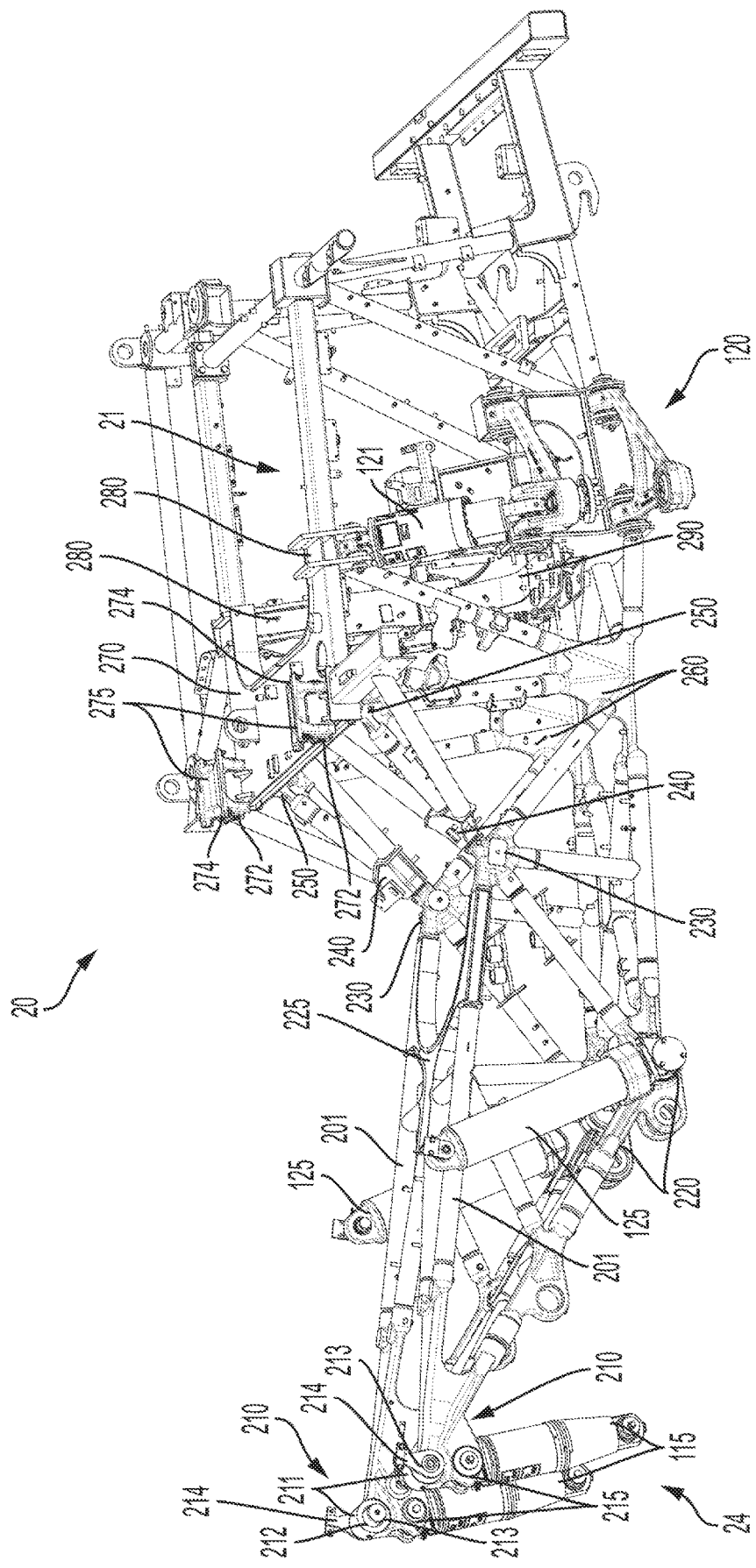
FIG. 3 is a side view of a space frame according to embodiments of the disclosed subject matter.
Figure 4:
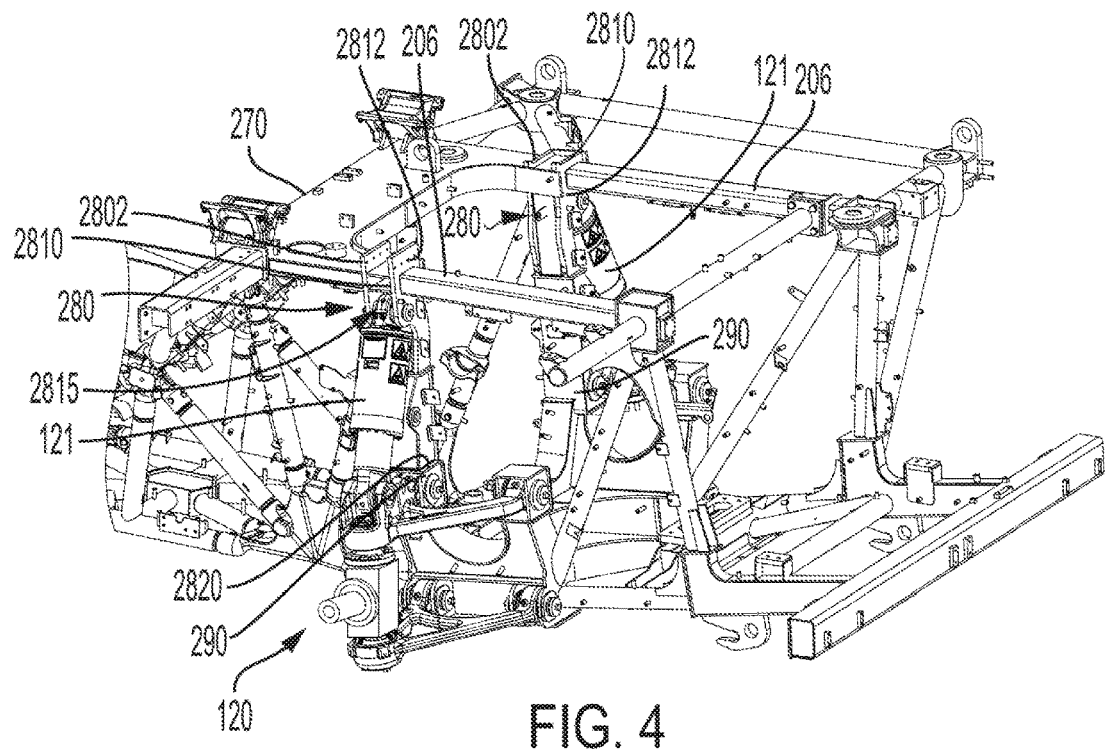
FIG. 4 is a front, side perspective view of a front upper suspension connection according to embodiments of the disclosed subject matter.
Figure 5:
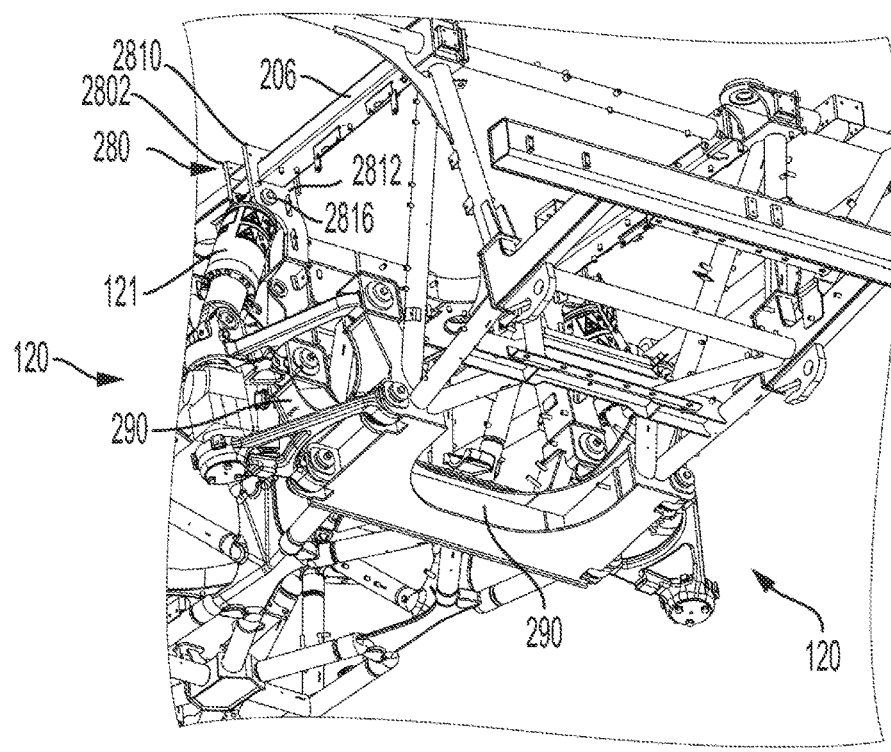
FIGS. 5 and 6 are bottom perspective views of portions of the front upper suspension connection of FIG. 4.
Figure 6:
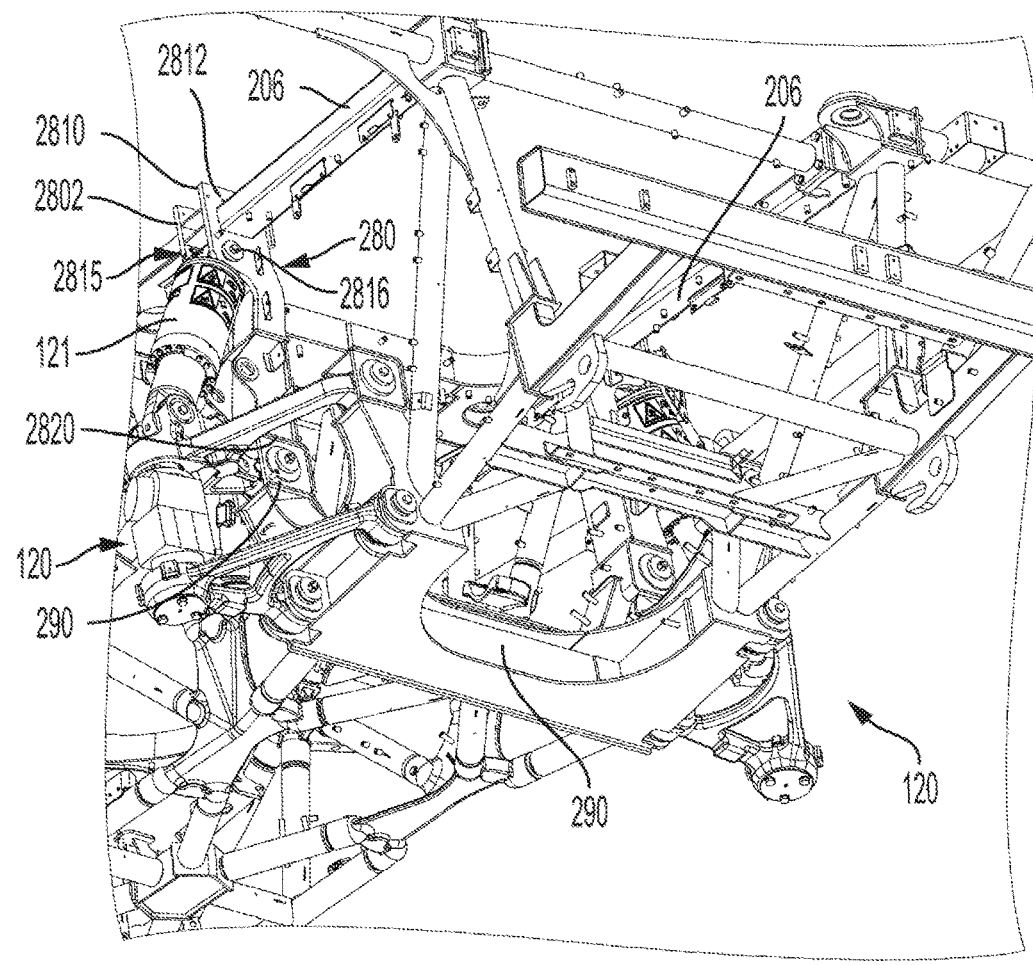
Figure 7:
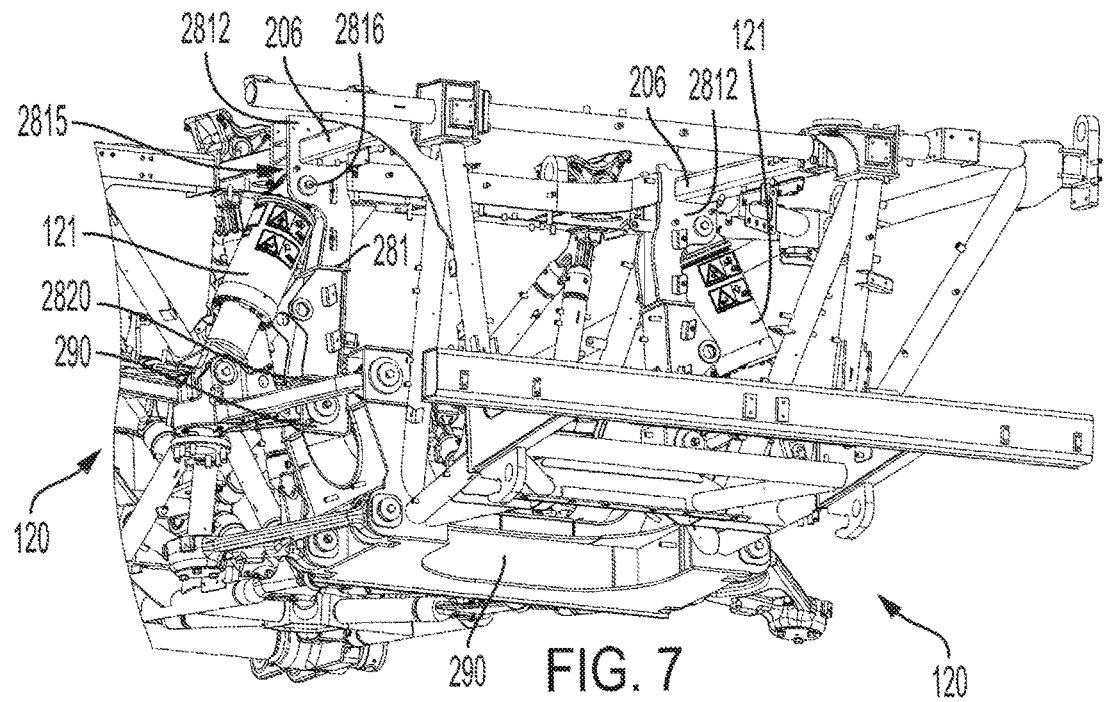
FIG. 7 is a front view of the front upper suspension connection of FIG. 4.

FIG. 3 is a more detailed view of the space frame 20. As shown, the space frame 20 can include a pair of rear frame connections 210 at the rear 24 of the space frame 20, a pair of center lower frame connections 220, a center upper horizontal frame connection 225, a pair of center upper frame connections 230, a pair of center upper frame nodal connections 240, a pair of front upper frame connections 250, a pair of front lower frame connections 260, a front upper frame connection 270, a pair of front upper suspension connections 280, and a front lower suspension connection 290. Though the foregoing connections are described as pairs, the connections of a pair may not be identical. For instance, the connections of a pair may be symmetrical, generally, but not necessarily identical. The foregoing connections can be castings or fabrications. In general, a casting may refer to a connection that is not welded to another support component of the space frame 20, and a fabrication may refer to a connection that is welded to another support component of the space frame 20.

The center lower frame connections 220 and corresponding connections can be as set forth in U.S. application Ser. No. 16/663,892 filed Oct. 25, 2019 (Case 19-0767); the center upper frame connection 225 and corresponding connections can be as set forth in U.S. application Ser. No. 16/663,930 filed Oct. 25, 2019 (Case 19-0768); the center upper frame connections 230 and corresponding connections can be as set forth in U.S. application Ser. No. 16/664,042 filed Oct. 25, 2019 (Case 19-0773); the center upper frame nodal connections 240 and corresponding connections can be as set forth in U.S. application Ser. No. 16/663,955 filed Oct. 25, 2019 (Case 19-0771); the front upper frame connections 250 and corresponding connections can be as set forth in U.S. application Ser. No. 16/664,010 filed Oct. 25, 2019 (Case 19-0772); the front lower frame connections 260 and corresponding connections can be as set forth in U.S. application Ser. No. 16/664,104 filed Oct. 25, 2019 (Case 19-0762); and/or the front lower suspension connection 290 and corresponding connections can be as set forth in U.S. application Ser. No.

16/664,169 filed Oct. 25, 2019 (Case 19-0760). The foregoing applications are incorporated herein by reference in their entireties.

The space frame 20 can also include a plurality of elongate support members, such as elongate support members 201, elongate support members 206, and elongate support members 209. Elongate support members, according to embodiments of the disclosed subject matter, can be in the form of rods and/or tubes, circular or square in cross section, for instance, where some or all of the rods and/or tubes may be solid or hollow.

Each elongate support member 201 can be provided between the rear frame connections 210 and the front upper frame connection 270 in a top plan view of the space frame 20. More specifically, each elongate support member 201 can be provided between the center upper horizontal frame connection 225 and one of the rear frame connections 210. Further, each elongate support member 201 can extend lengthwise generally horizontally, in this case rearward from the center upper horizontal frame connection 225 at a positive acute angle relative to a horizontal plane running through the front wheels 14 and the rear wheels 16. In that the elongate support members 201 are provided at an outer portion of the space frame 20 in a width direction of the space frame 20, the elongate support members 201 may be considered outer elongate support members 201. As an example, the outer elongate support members 201 may be outer frame tubes.

Each rear frame connection 210, which may be a casting, can have a rear support 211 and a rear suspension node 215. Discussed in more detail below, the rear support 211 can directly support the dump body 30, and the rear suspension node 215 can be coupled to a rear suspension member 115 of the rear suspension system. The rear frame connections 210 can also be coupled to a plurality of elongate support members, including elongate support members 201. According to one or more embodiments of the disclosed subject matter, each of the rear frame connections 210 can be seven-point connections. For instance, according to embodiments of the disclosed subject matter, the rear frame connections 210 and corresponding connections can be as set forth in U.S. application Ser. No. 16/663,815 filed Oct. 25, 2019 (Case 19-0764), which is incorporated herein by reference in its entirety.

The rear support 211 can be configured as a pivot pin boss with a pivot pin bore or opening 212. According to one or more embodiments, an outer surface of the rear support 211 (i.e., pivot pin boss) and the pivot pin bore 212 can be cylindrical. An axis of the pivot pin bore 212 can extend in a width direction of the space frame 20. Moreover, the axes of the pivot pin bores 212 from the rear supports 211 of the pair of rear frame connections 210 may be aligned with each other. That is, the axes of the pivot pin bores 212 can be coaxial or common. The pivot pin bore 212 can be configured to receive a pivot pin of a pivot pin interface 213 such that the pivot pin interface 213 is pivotally coupled to the rear support 211 via the pivot pin bore 212 and the pivot pin interface 213 can pivot or rotate about the axes of the pivot pin bore 212 and the pivot pin of the pivot pin interface 213. Discussed in more detail below, the pivot pin interface 213 can also be coupled to a bottom 35 of the dump body 30.

As shown in FIG. 3, the front upper frame connection 270 can be fixedly coupled to the front upper suspension connections 280, and a bottom of the front upper frame connection 270 can be fixedly coupled to the front upper frame connections 250. Additionally, the front upper frame connection 270, which may be a fabrication, can have a body with a pair of rocker attachment interfaces 272 on a top surface thereof. According to one or more embodiments, the front upper frame connection 270 and corresponding connections can be as set forth in U.S. application Ser. No. 16/663,849 filed Oct. 25, 2019 (Case 19-0766), which is incorporated herein by reference in its entirety.

The rocker attachment interfaces 272 can be spaced from each other in a width direction of the space frame 20, for instance, provided at opposite outer lateral edges of the body of the front upper frame connection 270, such as shown in FIG. 3. Each rocker attachment interface 272 can have a pivot pin bore configured to receive a pivot pin. Optionally, the pivot pin can be considered part of the rocker attachment interface 272. An axis of rotation for the pivot pin bore and the pivot pin can run horizontally or substantially horizontally in a length direction of the space frame 20. Moreover, the axes of rotation for the rocker attachment interfaces 272 can be parallel to each other.

Each rocker attachment interface 272 can have rotatably or pivotally attached thereto a support rocker 274 via the pivot pin. In that the rocker attachment interfaces 272 can be spaced apart from each other in the width direction of the space frame 20, so too can be the support rockers 274. Moreover, the support rockers 274 can rotate or pivot laterally or in a width direction of the space frame 20 about the respective axes of rotation defined by the rocker attachment interfaces 272.

According to embodiments of the disclosed subject matter, each support rocker 274 can have an upward-facing contact surface 275. The upward-facing contact surface 275 can be concave, for instance, semi-cylindrical, elliptical, or multi-planar. Additionally, the upward-facing contact surface 275 can be or include a padding. According to embodiments of the disclosed subject matter, the support rocker 274 and/or components thereof, can be according to U.S. application Ser. No. 16/663,512 filed Oct. 25, 2019 (Case 18-1266) and/or U.S. application Ser. No. 16/663,551 filed Oct. 25, 2019 (Case 19-0783), each of which is incorporated herein by reference in its entirety. Discussed in more detail below, the support rockers 274, particularly the upward-facing contact surfaces 275 thereof, can receive a portion of corresponding vertical support structures 370 of the dump body 30 (see FIG. 10).

Referring now to FIGS. 4-9, the front upper suspension connections 280, which can be fabrications, can be elongate with a height or length greater than a width (in the width direction of the space frame 20) and a thickness (in the length direction of the space frame 20). The front upper suspension connections 280 can have a first wall 2802, a second wall 2810 spaced from and opposite the first wall 2802, and a bottom interface or surface 2820. The first wall 2802 may be referred to herein as a rear wall, and the second wall 2810 may be referred to herein as a front wall. Moreover, the first wall 2802 and the second wall 2810 can be plates.

The first wall 2802 can have a top rear mounting surface 2804 and a lower rear mounting surface 2806, which may be below the top rear mounting surface 2804. The second wall 2810 can have a top front mounting surface 2812. Optionally, the top front mounting surface 2812 can be at a same height as the top rear mounting surface 2804. According to one or more embodiments, the first wall 2802 and the second wall 2810 can be parallel to each other. Thus, the top rear mounting surface 2804 and the lower rear mounting surface 2806 may be parallel to the top front mounting surface 2812.

Each front upper suspension connection 280 can also have a front strut attachment interface or point 2815. The front strut attachment interface 2815 can be located below the top rear mounting surface 2804 and the top front mounting surface 2812. Additionally or alternatively, the front strut attachment interface 2815 can be at a same height as the lower rear mounting surface 2806. According to one or more embodiments, the front strut attachment interface 2815 can face outward, for instance, for lateral access. Thus, in the case of the two front upper suspension connections 280, the front strut attachment interfaces 2815 thereof can face outward in the width direction of the space frame 20, in opposite directions, for instance.

The front strut attachment interface 2815 can include a first hole or opening 2803, which may be provided in the first wall 2802, a second hole or opening 2811, which may be provided in the second wall 2810. The first hole 2803 can be coaxial with the second hole 2811. A front strut attachment pin 2816 can also be provided. The front strut attachment pin 2816 can be adapted to pass through the first hole 2803, the second hole 2811, and a top mounting hole 122 of the front strut 121.

According to one or more embodiments, the front upper suspension connection 280 can have a top segment and a bottom segment. An interface 281 can delineate a boundary between the top and bottom segments. The bottom segment can be below the top segment and, optionally, may be in direct contact with the top segment. According to one or more embodiments, the top segment and the bottom segment can be integral or fabricated in one piece.

The top segment can have the top rear mounting surface 2804, the top front mounting surface 2412, the front strut attachment interface 2815, and the lower rear mounting surface 2806. The bottom segment can have the bottom interface 2820. Optionally, the bottom segment can also have an attachment point or interface 2822. The attachment interface 2822 can be below the front strut attachment interface 2815. Moreover, the attachment interface 2822 can be comprised of spaced apart walls having respective openings or holes. The openings may be coaxial.

The bottom surface of the bottom interface 2820 can be adapted to be fixedly attached (e.g., weldably attached) to front lower suspension connection 290. According to one or more embodiments, the bottom surface 2820 can have a width less than a width of the corresponding surface of the front lower suspension connection 290 to which the bottom surface of the bottom interface 2820 is fixedly attached.

The top rear mounting surface 2804 can be adapted to be fixedly attached (e.g., weldably attached) to front upper frame connection 270. For example, the top rear mounting surface 2804 can be fixedly attached to a forward flat mounting surface of the front upper frame connection 270. A forward support plate of the front upper frame connection 270 may also be provided in contact with the front upper suspension connection 280, for instance, extending perpendicular to the forward flat mounting surface past the first wall 2802 and the second wall 2810.

The top front mounting surface 2812 can be adapted to be fixedly attached (e.g., weldably attached) to elongate support member 206. Optionally, the elongate support member 206 can be square in cross section and/or may extend horizontally or substantially horizontally (e.g., 1-2 degrees from horizontal) from the top front mounting surface 2812.

Figure 8:
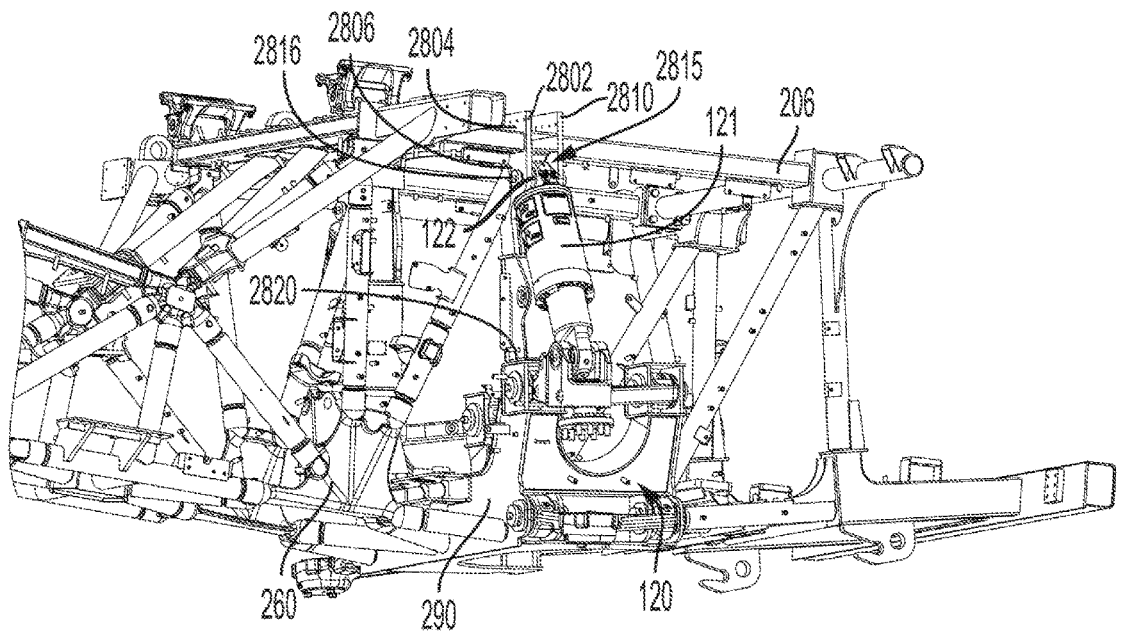
FIGS. 8 and 9 are side views of the front upper suspension connection of FIG. 4.
Figure 9:
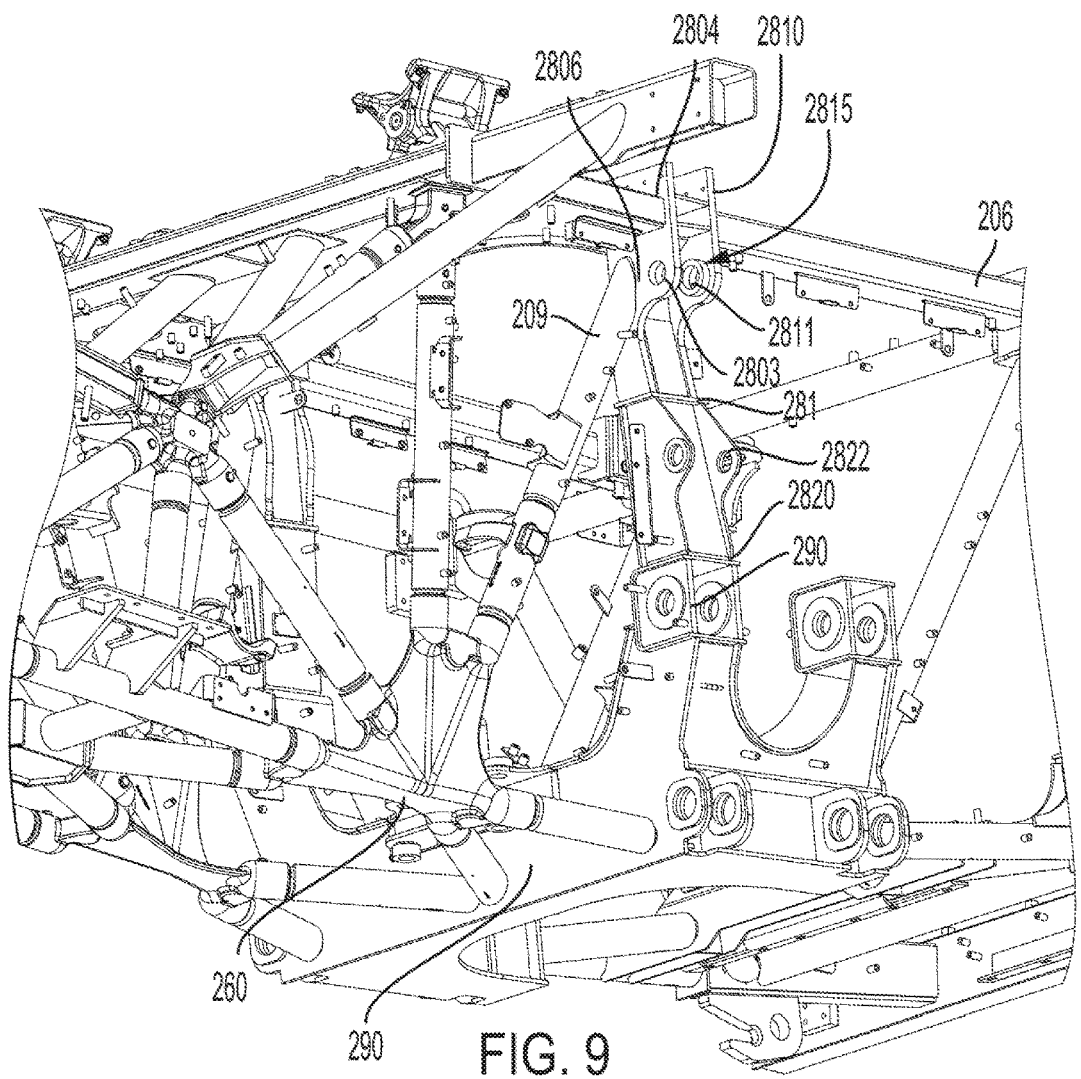

The lower rear mounting surface 2806 can be adapted to have fixedly attached (e.g., weldably attached) thereto elongate support member 209. As shown in FIGS. 8 and 9, for instance, the elongate support member 209 can extend from the lower rear mounting surface 2806 rearward at an angle. The angle may be acute relative to vertical in a side view of the front upper suspension connection 280. Thus, in one or more embodiments, the elongate support member 209 can be considered an angled elongate support member 209, for instance, an angled front frame tube. The elongate support member 209 may be fixedly attached to front lower frame connection 260.

The front strut attachment interface 2815 can be adapted to pivotally attach the front strut 121, for instance, by way of the first hole 2803, the second hole 2811, and the front strut attachment pin 2816 provided therethrough and through the top mounting hole 122 of the front strut 121. A cutout or curved portion or portions below the first hole 2803 and the second hole 2811 can be to accommodate a neck portion of the front strut 121.

Figure 10:
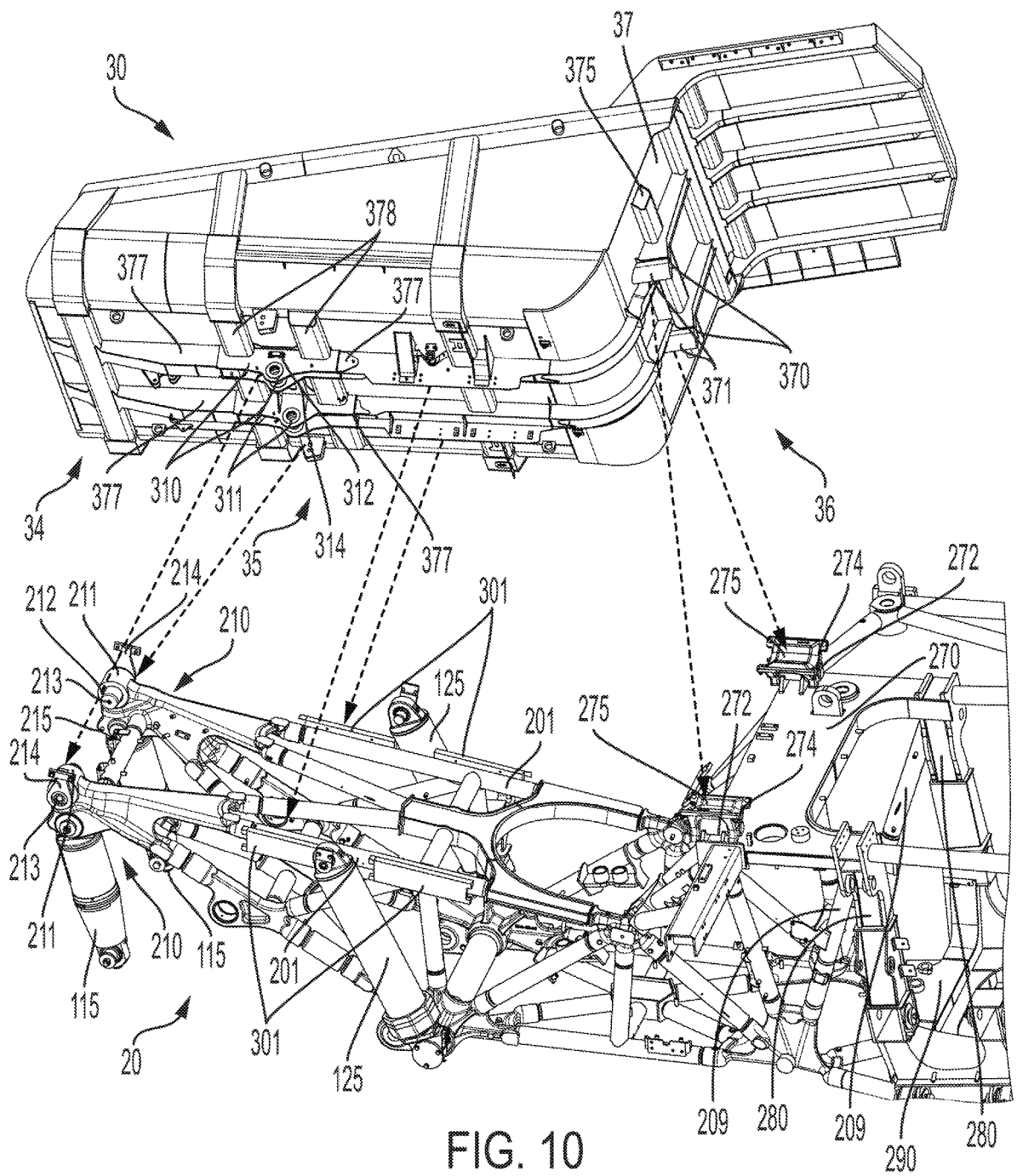
FIG. 10 is an exploded view of the space frame and dump body to show defined contact points according to embodiments of the disclosed subject matter.

Turning now to FIG. 10, the dump body 30 can have, on the bottom 35 thereof, a rear pivot support 310 and a pair of flat contact surfaces 301, and on the front wall 37 thereof, a pair of vertical support structures 370.

The rear pivot support 310 can be provided at the rear portion 34 of the dump body 30, such as shown in FIG. 10. The rear pivot support 310 can have a pair of rear pivots 311. The rear pivots 311 can be spaced apart from each other in a width or lateral direction of the dump body 30, such as shown in FIG. 10. The rear pivot support 310 can also include a cross-member 314, which can be provided between the rear pivots 311, fixedly connected to or part of the rear pivots 311 (i.e., integral and/or one-piece with).

The rear pivot support 310 can be fixedly coupled to the bottom 35 of the dump body 30. For example, the rear pivot support 310 can be welded to the bottom 35 of the dump body 30. More specifically, according to one or more embodiments of the disclosed subject matter, each rear pivot 311 can be welded to a corresponding longitudinal body support member 377 on the bottom of the dump body 30. As shown in FIG. 10, for instance, each rear pivot 311 can be welded in-line with the corresponding longitudinal body support member 377. Thus, the rear pivot 311 can be considered as part of the longitudinal body support member 377 (i.e., integral and/or one-piece with).

Each rear pivot 311 can also include a plurality of cut-outs, for instance, two cut-outs, spaced apart from each other in a length direction of the dump body 30. Each cut-out can receive or accept a transverse body support member 378. Moreover, the cut-outs of one of the rear pivots 311 can receive different transverse body support members 378, for instance, adjacent transverse body support members 378, such as shown in FIG. 10. Additionally, as shown, each transverse body support member 378 can extend through one cut-out of one rear pivot 311 and through an opposing cut-out of the other rear pivot 311.

According to one or more embodiments of the disclosed subject matter, the rear pivots 311 can also include an attachment interface 312 on an outer side surface thereof, such as shown in FIG. 10. As a non-limiting example, the attachment interface 312 can include a pair of projections configured to mate with corresponding notches of the pivot pin interface 213. The rear pivot support 310 and corresponding connections can be as set forth in U.S. application Ser. No. 16/663,627 filed Oct. 25, 2019 (Case 19-0763), which is incorporated herein by reference in its entirety.

The rear pivots 311 can be pivotally coupled to the rear supports 211 of the space frame 20 via the pivot pin interface 213. More specifically, for each rear pivot 311/rear support 211 pair, the rear support 211 can be provided in a pivot bore of the rear pivot 311 (e.g., between the two pivot bore portions of a single rear pivot 311) such that the pivot bore 212 of the rear support 211 is aligned with the pivot bore and such that a pin of the pivot pin interface 213 extends through the pivot bore 212 of the rear support 211 and the pivot bore of the rear pivot 311. An arm 214 of the pivot pin interface 213 can have one or more notches configured to be mated with corresponding one or more projections of the attachment interface 312.

The pivot pin interface 213 can be held in place by way of the interconnection between the notches of the pivot pin interface 213 and the projections of the attachment interface 312. Moreover, the arm 214 can be fixedly coupled to the attachment interface 312. For example, a bracket can be fixedly or removably coupled to the projections, over the arm 214 of the pivot pin interface 213, to prevent the pivot pin interface 213 from moving laterally outward from the rear pivot 311. The bracket can be fixed to the projections via bolts, rivets, or welding as non-limiting examples.

The bottom 35 of the dump body 30 can include the plurality of flat contact surfaces 301, such as shown in FIG. 10. The flat contact surfaces 301 may be in the form of a plate, such as a rectangular or square plate, though embodiments of the disclosed subject matter are not limited to the foregoing geometries. Optionally, the flat contact surfaces 301 can have a chamfered portion on a bottom edge thereof. The flat contact surfaces 301 can be provided generally at a middle portion of the dump body 30. In a top plan view of the dump body 30, the pair of flat contact surfaces 301 can be between the rear pivot support 310 and the pair of vertical support structures 370 in the length direction of the dump body 30. Additionally, the flat contact surfaces 301 can be provided on corresponding longitudinal support body members 377. For instance, the flat contact surfaces 301 can be provided on inward-facing surfaces of the longitudinal support body members 377. Thus, in embodiments of the disclosed subject matter, the flat contact surfaces 301 can be vertically-oriented, such as shown in FIG. 10. Moreover, the flat contact surface 301 on one longitudinal support body member 377 can be spaced apart from the flat contact surface 301 on the opposing longitudinal support body member 377 in the width direction of the dump body 30. The flat contact surfaces 301 can be coupled to the longitudinal support body members 377, for instance, by welding, rivets, or bolts, as non-limiting examples.

According to one or more embodiments, each flat contact surface 301 can be comprised of a first flat contact surface portion and a second flat contact surface portion spaced from the first flat contact surface portion in the length direction of the dump body 30, such as shown in FIG. 10. Optionally, the first and second flat contact surface portions of the flat contact surface 301 may be of the same configuration. Of course, each flat contact surface 301, according to one or more embodiments of the disclosed subject matter, may be represented by a single flat contact surface (e.g., a single plate). For example, only one of the first or second flat contact surface portions shown in FIG. 10 may constitute the flat contact surface 301.

Discussed in more detail below, when the dump body 30 is in a lowered position (i.e., rest position), the flat contact surfaces 301 attached to the dump body 30 can be positioned as shown in FIG. 10. That is, the flat contact surfaces 301 can be provided adjacent to outer or lateral sides of the outer elongate support members 201. According to one or more embodiments, the flat contact surfaces 301 can be parallel to the outer elongate support members 201.

The vertical support structures 370 of the dump body 30 can extend from a front face of front wall 37 of the dump body 30. The vertical support structures 370 can be fixed to the front face of the front wall 37, for instance, via welding.

The vertical support structures 370 can be spaced apart from each other in the width direction of the dump body 30. According to one or more embodiments, the vertical support structures 370 can be centered on opposite sides of a vertical centerline of the dump body 30 in a front view of the machine 10, such as shown in FIG. 2. The vertical support structures 370 can be as set forth in U.S. application Ser. No. 16/663,825 filed Oct. 25, 2019 (Case 19-0770), which is incorporated herein by reference in its entirety.

Vertical support structures 370 can be vertical in at least the front view of the dump body 30. Depending upon the configuration of the front wall 37 of the dump body 30, in a side view of the dump body 30 the vertical support structures 370 may be generally vertical, for instance, at an angle 10 degrees or less from vertical.

According to one or more embodiments, the vertical support structures 370 can extend through a horizontal support structure 375, which can also be fixed (e.g., welded) to the front face of the front wall 37. Intersecting surfaces of the horizontal support structure 375 and each vertical support structure 370 can be fixedly attached via welding, for instance. The horizontal support structure 375 can be as set forth in U.S. application Ser. No. 16/663,825 filed Oct. 25, 2019 (Case 19-0770), which, as noted above, is incorporated herein by reference in its entirety.

Each vertical support structure 370 can have a down-facing contact surface 371. According to one or more embodiments, the down-facing contact surface 371 can be convex, for instance, semi-cylindrical, elliptical, or multi-planar. The down-facing contact surfaces 371 can be configured to be received or seated in the upward-facing contact surfaces 275 of the support rockers 274. Unlike the support rockers 274, the vertical support structures 370, themselves, do not pivot.

INDUSTRIAL APPLICABILITY

As noted above, embodiments of the present disclosure relate to space frame front upper suspension connections, and systems, components, and methods thereof.

Embodiments of the disclosed subject matter can provide a lightweight, durable machine configuration with a reliable support definition of load points between the dump body 30 and the space frame 20, for instance, in light of dimensional variations due to tolerances and/or component deflection.

In terms of components of the space frame 20, the space frame 20 can include a pair of the front upper suspension connections 280. Each front upper suspension connection 280, which may be a fabrication, can be elongate with a height or length greater than a width (in the width direction of the space frame 20) and a thickness (in the length direction of the space frame 20). The front upper suspension connections 280 can have a first wall 2802, a second wall 2810 spaced from and opposite the first wall 2802, and a bottom interface or surface 2820.

According to one or more embodiments, the front upper suspension connection 280 can have a top segment and a bottom segment. An interface 281 can delineate a boundary between the top and bottom segments. The bottom segment can be below the top segment and, optionally, may be in direct contact with the top segment. According to one or more embodiments, the top segment and the bottom segment can be integral or fabricated in one piece.

The top segment can have the top rear mounting surface 2804, the top front mounting surface 2812, the front strut attachment interface 2815, and the lower rear mounting surface 2806. The bottom segment can have the bottom interface 2820. Optionally, the bottom segment can also have an attachment point or interface 2822. The attachment interface 2822 can be below the front strut attachment interface 2815. Moreover, the attachment interface 2822 can be comprised of spaced apart walls having respective openings or holes. The openings may be coaxial.

The bottom surface of the bottom interface 2820 can be fixedly attached (e.g., weldably attached) to front lower suspension connection 290. According to one or more embodiments, the bottom interface 2820 can have a width less than a width of the corresponding surface of the front lower suspension connection 290 to which the bottom surface of the bottom interface 2820 is fixedly attached.

The top rear mounting surface 2804 can be fixedly attached (e.g., weldably attached) to front upper frame connection 270. For example, the top rear mounting surface 2804 can be fixedly attached to a forward flat mounting surface of the front upper frame connection 270. A forward support plate of the front upper frame connection 270 may also be provided in contact with the front upper suspension connection 280, for instance, extending perpendicular to the forward flat mounting surface past the first wall 2802 and the second wall 2810.

The top front mounting surface 2812 can be fixedly attached (e.g., weldably attached) to elongate support member 206. Optionally, the elongate support member 206 can be square in cross section and/or may extend horizontally or substantially horizontally (e.g., 1-2 degrees from horizontal) from the top front mounting surface 2812.

The lower rear mounting surface 2806 can have fixedly attached (e.g., weldably attached) thereto elongate support member 209. The elongate support member 209 can extend from the lower rear mounting surface 2806 rearward at an angle. The angle may be acute relative to vertical in a side view of the front upper suspension connection 280. Thus, in one or more embodiments, the elongate support member 209 can be considered an angled elongate support member 209, for instance, an angled front frame tube. The elongate support member 209 may be fixedly attached to front lower frame connection 260.

The front strut attachment interface 2815 can pivotally attach the front strut 121, for instance, by way of the first hole 2803, the second hole 2811, and the front strut attachment pin 2816 provided therethrough and through the top mounting hole 122 of the front strut 121. A cutout or curved portion or portions below the first hole 2803 and the second hole 2811 can be to accommodate a neck portion of the front strut 121.

According to embodiments of the disclosed subject matter, the dump body 30 can operatively contact the space frame 20 according to a predetermined contact arrangement. For example, embodiments of the disclosed subject matter can provide for a six-point contact arrangement between the dump body 30 and the space frame 20. According to embodiments of the disclosed subject matter, such contact arrangement can be provided when the dump body 30 is in a rest position. Rest position as used herein can mean that the dump body 30 is in a lower-most or fully down position and not raised by the lift cylinders 125, which may be coupled to the center lower frame connections 220.

Referring to FIG. 10, which shows an exploded view of the space frame 20 and the dump body 30 of the machine 10, a first pair of contact points can be provided by the rear supports 211 of the space frame 20 and the rear pivots 311 of the rear pivot supports 310 of the dump body 30. Each rear support 211 can be pivotally connected to the dump body 30 via the rear pivot 311. Such connection can allow the front portion 36 of the dump body 30 to be raised and lowered between upper-most and lower-most positions via rotation about the common pivot axis created by the connection between the rear supports 211 and the rear pivots 311.

A second pair of contact points can be provided by the positioning of the flat contact surfaces 301 relative to the elongate support members 201. In particular, the flat contact surfaces 301, which notably can be on or part of the dump body 30 and not the space frame 20, can be provided adjacent to outer or lateral sides of the elongate support members 201, such as shown in FIG. 10. As noted above, the flat contact surfaces 301 may be positioned parallel to the elongate support members 201. Additionally, according to one or more embodiments of the disclosed subject matter, the flat contact surfaces 301 can contact the elongate support members 201. Such positioning of the flat contact surfaces 301 can be when the dump body 30 is in the lower-most or rest position. Moreover, such positioning of the flat contact surfaces 301 can accommodate for lateral or horizontal forces from the corresponding the elongate support members 201 of the space frame 20. Additionally, as noted above, the flat contact surfaces 301 may have a chamfered portion on a bottom edge thereof. Such chamfered portion can aid in the centering of the dump body 30 when the dump body 30 is transitioned to the rest or fully down position.

A third pair of contact points can be provided by the positioning of the vertical support structures 370, particularly the down-facing contact surfaces 371 thereof, removably on the support rockers 274, particularly the upward-facing contact surfaces 275 thereof. According to embodiments of the disclosed subject matter, the down-facing contact surface 371 can be removably seated on the upward-facing contact surface 275. Additionally, in a front view of the machine 10 a vertical centerline axis of the down-facing contact surface 371 of each of the vertical support structures 370 can be offset from the axis of rotation (i.e., pivot axis) of a corresponding one of the support rockers 274. For example, as shown in FIG. 2, the vertical centerline axis of the down-facing contact surface 371 can be offset inward in a width direction of the machine 10 relative to the axis of rotation for the support rocker 274.

The vertical support structures 370, particularly the down-facing contact surfaces 371 when contacting the upward-facing contact surfaces 275 of the support rockers 274, can transfer loading through the space frame 20 to the front suspension system and the front wheels 14. Moreover, the vertical support structures 370 can provide support for horizontal components of force vectors with respect to the dump body 30 load being transferred through the space frame 20 and the front suspension system to the front wheels 14. Additionally, because the support rockers 274 can pivot laterally and independently of each other, and because both the support rockers 274 and the vertical support structures 370 have cooperating contact surfaces (i.e., upward-facing contact surfaces 275 and down-facing contact surfaces 371, respectively), proper seating between the vertical support structures 370 and the support rockers 274 can be maintained, particularly when the dump body 30 is in the at-rest position, even when the machine 10 is moving, for instance. Such arrangement, as diagrammatically shown in FIG. 2, can thus provide an even load distribution LD with respect to each side of the support arrangement (i.e., side to side or laterally).

Additionally shown in FIG. 2, in a front view the support rocker 274/vertical support structure 370 combinations can be located along longitudinal axes of respective front struts 121 connected to respective front suspension members 120 on same sides of the space frame 20. For example, the pivot axis of the support rocker 274 may be aligned with a longitudinal axis a corresponding front strut 121. The longitudinal axes can intersect at a point $CL_1$ at a vertical centerline at a top of the dump body 30. Of course, embodiments of the disclosed subject matter are not so limited, and the longitudinal axis of the front strut 121 may not be aligned with the support rocker 274/vertical support structure 370 combination, such as the pivot axis of the support rocker 274. Also shown in FIG. 2, longitudinal axes of additional suspension members on opposite sides of the space frame 20 can intersect at a point $CL_2$ at the same vertical centerline of the machine 10 as point $CL_1$. The arrangement of the third pair of contact points, therefore, can uniformly transfer load from the dump body 30 through the support rockers 274 and the space frame 20 to the front suspension system.

While aspects of the present disclosure have been particularly shown and described with reference to the embodiments above, it will be understood by those skilled in the art that various additional embodiments may be contemplated by the modification of the disclosed machines, assemblies, systems, and methods without departing from the spirit and scope of what is disclosed. Such embodiments should be understood to fall within the scope of the present disclosure as determined based upon the claims and any equivalents thereof.

The invention claimed is:

1. A front upper suspension connection fabrication for a space frame of a haul truck comprising:
    a bottom surface configured to weldably attach to a front lower suspension connection fabrication;
    a top rear mounting surface configured to weldably attach to a front upper frame connection fabrication;
    a top front mounting surface configured to weldably attach to a horizontal front frame tube;
    a front strut attachment point located below the top rear mounting surface and the top front mounting surface configured to pivotably attach a front strut of a front suspension system, wherein the front strut attachment point includes:
        a hole passing through the top rear mounting surface,
        a coaxial hole passing through the top front mounting surface, and
        a front strut attachment pin configured to pass through the top rear mounting surface, the top front mounting surface, and a top mounting hole integral to the front strut; and
    a lower rear mounting surface located below the top rear mounting surface configured to weldably attach an angled front frame tube that connects the front upper suspension connection fabrication to a front lower frame connection casting.

2. The front upper suspension connection fabrication of claim 1, wherein the front upper suspension connection fabrication has a height greater than a width and a thickness.

3. The front upper suspension connection fabrication of claim 1, wherein the bottom surface has a width less than a width of the front upper suspension connection fabrication at the top rear mounting surface.

4. The front upper suspension connection fabrication of claim 1,
    wherein the top rear mounting surface and the lower rear mounting surface are of a rear wall of the front upper suspension connection fabrication, and
    wherein the top front mounting surface is of a front wall of the front upper suspension connection fabrication opposite the rear wall.

5. The front upper suspension connection fabrication of claim 1, wherein the front strut attachment point and the lower rear mounting surface are at a same height along a length of the front upper suspension connection fabrication.

6. The front upper suspension connection fabrication of claim 1, wherein the front strut attachment point faces outward.

7. The front upper suspension connection fabrication of claim 1, further comprising a top segment and a bottom segment,
    wherein the top segment has the top rear mounting surface, the top front mounting surface, the front strut attachment point, and the lower rear mounting surface, and the bottom segment has the bottom surface, and
    wherein the bottom segment further includes an attachment point, the attachment point being below the front strut attachment point.

8. A space frame of a rear haul truck comprising:
    a first front upper suspension connection fabrication; and
    a second front upper suspension connection fabrication spaced from the first front upper suspension connection fabrication in a width direction of the space frame,
    wherein each of the first and second front upper suspension connection fabrications includes:
        a bottom interface adapted to weldably attach to a front lower suspension connection fabrication,
        a rear plate having a top rear mounting surface adapted to weldably attach to a front upper frame connection fabrication, and a lower rear mounting surface below the top rear mounting surface adapted to weldably attach an angled front frame tube,
        a front plate having a top front mounting surface adapted to weldably attach to a horizontal front frame tube, and
        a front strut attachment interface located below the top rear mounting surface and the top front mounting surface adapted to pivotably attach a front strut of a front suspension system, wherein the front strut attachment interface has a first hole in the rear plate and a second hole in the front plate, the first and second holes being coaxial, and
    wherein the front strut attachment interfaces of the first and second front upper suspension connection fabrications face outward in opposite directions in the width direction of the space frame.

9. The space frame of claim 8, wherein each of the first and second front upper suspension connection fabrications further includes a front strut attachment pin passing through the first hole in the rear plate, the second hole in the front plate, and a top mounting hole integral to the front strut.

10. The space frame of claim 8, wherein, for each of the first and second front upper suspension connection fabrications the angled front frame tube connects to a front lower frame connection casting.

11. The space frame of claim 8, wherein each of the first and second front upper suspension connection fabrications has a height greater than a width and a thickness.

12. The space frame of claim 8, wherein the bottom interface of each of the first and second front upper suspension connection fabrications has a width less than a width at the top rear mounting surface.

13. The space frame of claim 8, wherein, for each of the first and second front upper suspension connection fabrications the front strut attachment interface and the lower rear mounting surface are at a same height.

14. The space frame of claim 8,
wherein each of the first and second front upper suspension connection fabrications further includes a top segment and a bottom segment below and contacting the top segment, and
wherein the top segment has the top rear mounting surface, the top front mounting surface, the front strut attachment interface, and the lower rear mounting surface, and the bottom segment has the bottom interface.

15. A method regarding a front upper suspension connection comprising:
providing a top segment of the front upper suspension connection; and
providing a bottom segment of the front upper suspension connection, the bottom segment being below and in direct contact with the top segment,
wherein the top segment includes:
a top rear mounting surface of a first wall adapted to fixedly attach to a front upper frame connection,
a lower rear mounting surface of the first wall below the top rear mounting surface adapted to fixedly attach a first elongate support member,
a top front mounting surface of a second wall spaced from the first wall adapted to fixedly attach to a second elongate support member, and
a front strut attachment interface below the top rear mounting surface and the top front mounting surface adapted to pivotably attach a front strut of a front suspension system, wherein the front strut attachment interface has a first hole in the first wall and a second hole in the second, the first and second holes being coaxial, and
wherein the bottom segment includes a bottom interface adapted to fixedly attach to a front lower suspension connection.

16. The method of claim 15, wherein the top segment and the bottom segment are integral with each other and fabricated in one piece.

17. The method of claim 15, further comprising:
fixedly attaching, via welding, the top rear mounting surface to the front upper frame connection;
fixedly attaching, via welding, the lower rear mounting surface to the first elongate support member;
fixedly attaching, via welding, the front mounting surface to the second elongate support member; and
fixedly attaching, via welding, the bottom interface to the front lower suspension connection.

18. The method of claim 15, further comprising pivotally attaching the front strut to the front strut attachment interface.

19. The method of claim 15,
wherein the front upper suspension connection has a height greater than a width and a thickness, and
wherein the bottom interface has a width less than the width of the front upper suspension connection at the top rear mounting surface.

20. The method of claim 15, wherein the first wall and the second wall are parallel to each other and perpendicular to the bottom interface.

* * * * *